UNITED STATES PATENT OFFICE.

PIETRO TONINETTI, OF HAMBURG, GERMANY.

IMPROVEMENT IN SOLUTIONS FOR PRESERVING MEAT.

Specification forming part of Letters Patent No. 195,420, dated September 18, 1877; application filed July 7, 1877.

*To all whom it may concern:*

Be it known that I, PIETRO TONINETTI, of Hamburg, in the Empire of Germany, have invented an Improved Means for Preserving Meat; and I do hereby declare that the following is a full, clear, and exact description of the same.

My improvement consists in the formation and employment of the preservative solution hereinafter described, used in the manner hereinafter set forth.

The said solution consists of the following ingredients in or about the proportions named, to wit: Biborate of soda, commonly known in commerce as "borax," fifty (50) grams, or seven hundred and seventy-one and seven-tenths (771.7) Troy grains; acetate of soda, three (3) grams, or forty-six and three hundred and two thousandths (46.302) Troy grains; borate of soda, one hundred and fifty (150) grams, or two thousand three hundred and fifteen and one-tenth (2315.1) Troy grains; pure chloride of sodium, fifty (50) grams, or seven hundred and seventy-one and seven-tenths (771.7) Troy grains; nitrate of potash, twenty-five (25) grams, or three hundred and eighty-five and eighty-five hundredths, (385.85) Troy grains; acetate of ammonia, one (1) gram, or fifteen and four hundred and thirty-four thousandths (15.434) Troy grains; thymic acid, (thymol,) one-tenth (0.1) of a gram, or one and five thousand four hundred and thirty-four ten-thousandths (1.5434) Troy grains; acetate of alumina, five-hundredths (0.05) of a gram, or seven thousand seven hundred and seventeen ten-thousandths (0.7717) of a Troy grain;. acetate of baryta, two-hundredths (0.02) of a gram, or thirty thousand eight hundred and sixty-eight hundred-thousandths (0.30868) of a Troy grain; water, one (1) liter, or two and one thousand one hundred and thirty-five ten-thousandths (2.1135) pints.

The said preservative ingredients are dissolved in the water, and the solution is then used for preserving meat by injecting the same into the veins, arteries, and muscles of the meat to be preserved, or by saturating the meat therewith in any suitable manner.

The solution thus applied is sufficient for the preservation of meat for ordinary purposes; but, according to the degree of conservation required, the solution may be made stronger or weaker by altering the proportion of water contained therein.

I do not claim the use of borax, common salt, and saltpeter, either separately or mixed, but only in connection with the other substances above enumerated, and as ingredients in the solution, substantially as hereinbefore described.

I claim—

The meat-preserving solution consisting of biborate of soda, acetate of soda, borate of soda, chloride of sodium, nitrate of potash, acetate of ammonia, crystallized thymic acid, acetate of alumina, acetate of baryta, and water, in or about the proportions herein described and set forth.

PIETRO TONINETTI.

Witnesses:
    J. ENGEL,
    H. DOUD.